Figures 1, 2:
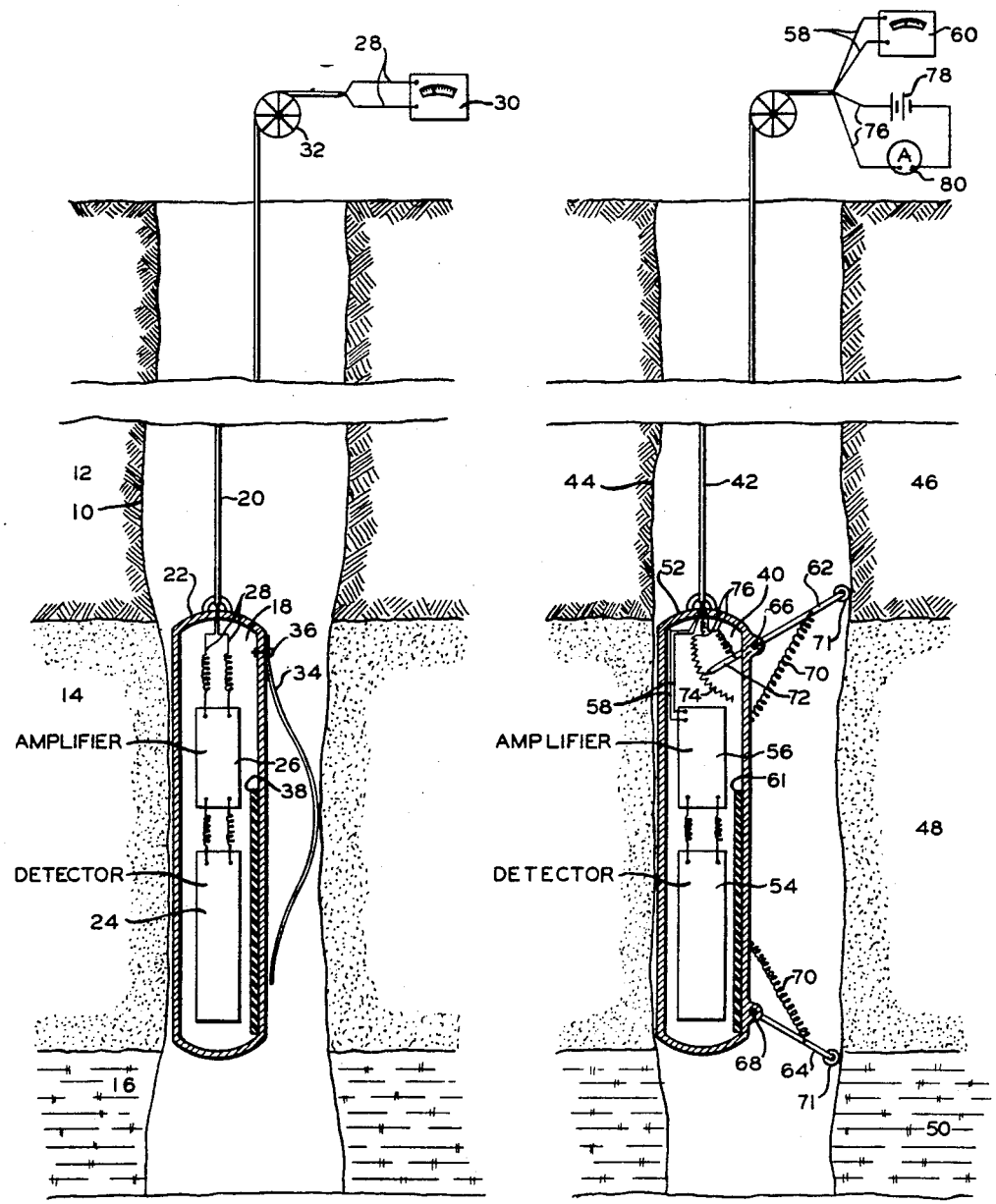

Feb. 20, 1945.   D. G. C. HARE   2,369,672
METHOD AND APPARATUS FOR LOGGING BORE HOLES
Filed Oct. 21, 1941

D. G. C. HARE
INVENTOR

Patented Feb. 20, 1945

2,369,672

UNITED STATES PATENT OFFICE 2,369,672

METHOD AND APPARATUS FOR LOGGING BOREHOLES

Donald G. C. Hare, New York, N. Y., assignor, by mesne assignments, to The Texas Company, New York, N. Y., a corporation of Delaware Application October 21, 1941, Serial No. 415,855

7 Claims. (Cl. 250—83.6)

This invention relates to the logging of bore holes and more particularly to the logging of a hole by measuring variations in the radioactivity of the formations traversed by the hole. Provision is also made for calipering the hole diameter simultaneously with the measurement of radiation.

The principal object of the invention is to provide a method and comparatively simple means for obtaining accurate measurements of the radioactivity of the formations without the difficulties which might otherwise be encountered because of non-uniformity of the bore hole diameter.

In the logging of a bore hole by measuring variations in radioactivity of the surrounding formations an instrument containing a detector of such radioactivity may be lowered into the hole by means of a wire line or cable, the detector being connected through the cable to suitable indicating or recording apparatus at the surface. In carrying out the method of logging by measuring variations in radioactivity of the formations traversed by the bore hole, inaccurate readings may be obtained because of variations in the diameter of the hole. The intensity of the radiation measured will depend somewhat on the amount of fluid surrounding the detecting instrument in the hole since this fluid may absorb a certain part of the radiation. Variations in the bore hole diameter will obviously result in there being varying amounts of fluid between the instrument and the bore hole walls and unless one is assured either of the instrument being in contact with a wall of the bore hole, or has knowledge of the bore hole diameter at the point where the detecting instrument is positioned, the proper interpretation of the log obtained may be difficult.

In carrying out the invention a detecting instrument adapted to be lowered through the hole is provided with means for maintaining the instrument in contact with the wall of the hole at all times. Radiation which would otherwise be picked up by the instrument at the side farthest from the wall of the hole is prevented from reaching the detector by a suitable radiation shield. The invention also contemplates a device which will hold a logging instrument against the side of the bore hole and at the same time provide an indication or measurement of the true diameter of the bore hole at the point opposite the instrument. This device may comprise one or more arms pivoted on the instrument and spring pressed against one side of the hole so as to force the instrument against the opposite wall. The angular position of the arms will vary with the hole diameter and this movement of the arms is measured by electrical means. In this manner the detecting instrument is held against the side of the hole wall so that accurate readings of radioactivity may be obtained, while at the same time the measurement of the hole diameter provides a check on the log obtained by means of the radiation detecting instrument.

For a better understanding of the invention reference may be had to the accompanying drawing in which Fig. 1 is a somewhat diagrammatic sectional elevation through a bore hole showing means for maintaining an instrument against the side of the hole, and Fig. 2 is also a sectional elevation through a bore hole showing a radiation detecting instrument and means for simultaneously calipering the hole diameter.

A bore hole 10 is shown as having been drilled through formations 12, 14 and 16. A logging device indicated generally at 18 is shown as being lowered through the hole by means of a cable 20. The logging device comprises a housing 22 within which is mounted a radiation detector 24 which may be a conventional Geiger-Muller counter or an ionization chamber but which is preferably a high efficiency radiation detector of the type disclosed in my co-pending application, Serial Number 364,020, filed November 2, 1940. The detector is connected electrically to a suitable amplifier 26 the output of which is connected by wires 28 passing through the cable 20 to a suitable measuring device or recording instrument 30. The cable 20 is shown as passing over a measuring device 32 which serves to indicate the depth of the instrument 18 in the hole. At one side of the housing 22 a spring 34 is mounted, this spring being curved so that it will rest against the opposite side or wall of the hole. One end of the spring 34 is shown as affixed by means of a suitable bolt 36 to the upper end of the housing 22 while the lower end of the spring is adapted to slide against the lower end of the housing so that the spring will accommodate itself to varying diameters of the hole. In this manner the casing or housing 22 of the instrument 18 will be pressed against the wall of the hole 10 so that there will be no drilling mud or other fluid between the instrument and the formations traversed by the hole. In order to prevent radiation from the formations at the side contacted by the spring 34 from being picked up by the detector 24, a suitable radiation shield 38 may be provided within the housing 22. In this manner the instrument 18 will be pressed against one side of the hole wall at all times during its passage through the hole and the response of the detector 24 will not be affected by the presence of drilling mud or other fluid in the hole.

In Fig. 2 a logging instrument 40 is shown as being lowered by means of a cable 42 through a hole 44 drilled through formations 46, 48 and 50. The instrument 40 comprises a housing 52 in which is mounted a radiation detector 54 connected to an amplifier 56 which in turn is connected by wires 58 passing through the cable 42 to an indicating or recording device 60 at the surface. A radiation shield member is preferably provided as at 61. Instead of the spring 34 of Fig. 1, a pair of arms 62 and 64 are shown as pivoted at 66 and 68, respectively, to one side of the housing 52. The arms 62 and 64 are mounted so that they can move in the plane of the longitudinal axis of the instrument 40 and a pair of tension springs 70 connected to the arms and to the housing bias the arms toward positions at right angles to the housing. The outer ends of the arms 62 and 64 may be provided with small wheels 71, as shown, or with skid members adapted to slide over the hole walls. As the instrument 40 is lowered through the hole the spring-pressed arms 62 and 64 will contact one side of the wall of the hole so as to press the instrument 40 against the opposite wall.

In order to measure or caliper the hole while the log is being made, the arm 62 is provided with an extension 72 the end of which is in contact at all times with a variable electrical resistance member 74. Wires 76 connect the arm extension 72 and the resistance 74 through the cables 42 with a source of electrical supply 78 and a measuring instrument such as an ammeter 80 at the surface. Thus, as the arm 62 moves counterclockwise, in viewing Fig. 2, to accommodate it to the larger diameter of the hole in the formation 48, the resistance of the circuit containing the element 74 will be varied and the ammeter 80 when properly calibrated will thus measure the varying diameter of the hole. If desired, the ammeter 80 may be replaced by a suitable recording device and the record so obtained can be used as a check against the log made by the instrument 40. It is believed obvious that, if desired, the apparatus shown in Fig. 2 can be used either alone to obtain a log of the formations surrounding the hole or to obtain a record of the diameter of the hole, or as previously described, the two records or logs may be obtained simultaneously.

Although the instruments 18 and 40 have been described as devices for measuring or detecting the radioactivity of the formations traversed by the hole, these instruments can obviously be of other types. For instance, a source of neutrons can be provided within either of the housings 18 or 40 and the detectors 24 or 54 then made responsive to fast or slow neutrons scattered in the formations around the hole and returned to the detectors. The log so obtained will indicate the nature of the formations penetrated by the hole.

Obviously, many modifications and variations of the invention, as hereinbefore set forth, may be made without departing from the spirit and scope thereof, and therefore only such limitations should be imposed as are indicated in the appended claims.

I claim:

1. The method of logging a bore hole which comprises passing a detector of penetrative radiation through the hole, maintaining said detector in contact with the side wall of said hole during said passage, recording variations in the intensity of radiation picked up by said detector as different formations are traversed, and simultaneously calipering the diameter of the hole opposite said detector.

2. A device for logging bore holes comprising a housing adapted to be lowered through a bore hole, a device in said housing for detecting penetrative radiation emitted by the formations traversed by said hole, means for maintaining said housing in contact with the wall of the hole as the device is lowered therethrough, and means for shielding said detecting device from radiation coming from the side of the hole opposite the point of contact between the detecting device and the wall of the hole.

3. A device adapted to be lowered through a bore hole to measure the radioactivity of the formations traversed by the hole comprising a detector of penetrative radiation, means for lowering said detector through the hole, means for maintaining said detector in contact with the wall of the hole during the lowering operation, said means comprising a resilient member secured to one side of the detector and adapted to engage one side of the hole wall so as to force the detector against the other side of the wall, and means for preventing radiation from that side of the wall contacted by the resilient member from striking said detector, comprising a radiation shield member disposed at the side of the detector toward said resilient member.

4. A device for logging bore holes comprising a housing adapted to be lowered through a bore hole, a device in said housing for detecting penetrative radiation emitted by the formations traversed by said hole, means for simultaneously maintaining said housing in contact with the wall of the hole and calipering said hole comprising an arm pivoted on said housing and adapted to engage the hole wall, springs means for forcing said arm against the hole wall at one side so as to press the housing against the hole wall at the other side, and means for measuring the amount of angular movement of said arm caused by variations in the diameter of the hole.

5. A device for logging bore holes comprising a housing adapted to be lowered through a bore hole, a device in said housing for detecting penetrative radiation emitted by the formations traversed by said hole, and means for simultaneously maintaining said housing in contact with the wall of the hole and calipering said hole comprising an arm pivoted on said housing and adapted to engage the hole wall, spring means for forcing said arm against the hole wall at one side so as to press the housing against the hole wall at the other side, and means for measuring the amount of angular movement of said arm, said last named means comprising an electric circuit including a source of electric current, a meter and a variable resistance in contact with said arm, the arrangement being such that movement of said arm caused by irregularities in the wall of the hole will vary the resistance of said circuit to provide an indication at said meter of the diameter of the hole.

6. A device adapted to be lowered through a bore hole to measure the radioactivity of the formations traversed by the hole comprising a detector of penetrative radiation, means for lowering said detector through the hole, means for maintaining said detector in contact with the wall of the hole during the lowering operation, said means comprising a resilient member secured to one side of the detector and adapted to slide along one side of the hole wall so as to force the detector against the other side of the wall, and means for calipering the hole opposite said detector comprising an electrical circuit including a meter and a variable resistance and means for varying said resistance in accordance with relative movement between said resilient member and said detector.

7. The method of logging a bore hole which comprises lowering a detector of penetrative radiation through the hole, maintaining said detector in contact with the side wall of said hole during the lowering operation, shielding said detector from penetrative radiation passing toward said detector from the side opposite to that in contact with the hole wall, recording variations in the intensities of radiations picked up by said detector as different formations are traversed, and simultaneously calipering the diameter of the hole opposite said detector.

DONALD G. C. HARE.